May 16, 1933.  O. LIED  1,908,771
AUTOMATICALLY OPERATING DISCHARGE DEVICE FOR CIGARETTE MACHINES
Filed May 21, 1931  2 Sheets-Sheet 1

Inventor:
O. Lied
By Marks & Clerk
Attys

May 16, 1933. O. LIED 1,908,771
AUTOMATICALLY OPERATING DISCHARGE DEVICE FOR CIGARETTE MACHINES
Filed May 21, 1931 2 Sheets-Sheet 2

Inventor:
O. Lied
By: Marks & Clerk
Attys.

Patented May 16, 1933

1,908,771

UNITED STATES PATENT OFFICE

OTTO LIED, OF WANDSBEK, GERMANY, ASSIGNOR TO THE FIRM "UNIVERSELLE" CIGARETTENMASCHINEN-FABRIK J. C. MÜLLER & CO., OF DRESDEN, GERMANY

AUTOMATICALLY OPERATING DISCHARGE DEVICE FOR CIGARETTE MACHINES

Application filed May 21, 1931, Serial No. 539,057, and in Germany May 31, 1930.

The present invention relates to an automatically operating discharge device for cigarette machines and especially to a device of this kind adapted to periodically remove cigarettes in groups from the delivery drum of a cigarette machine.

The average weight of cigarettes produced in a string cigarette machine is usually controlled by periodically and manually removing a plurality of cigarettes, for instance 20-25 pieces, from the delivery drum of the machine and weighing these cigarettes. This is a work which requires considerable time and the control is practically valueless if it is not performed carefully and exactly.

According to the present invention the cigarettes are periodically and automatically removed in groups by means of a special delivery element, which is so arranged and periodically moved relatively to the delivery drum that it in one end position is lying tangentially to the grooves or channels of the delivery drum, whereby a number of cigarettes in these grooves will be conveyed over the said element onto an automobile weighing apparatus. At the end of these discharge operations the said delivery element is automatically moved away from the delivery drum and during the intervals between the weighing operations the cigarettes will drop onto the usual conveyor device and be moved away from the machine in the usual manner.

A constructional form of the invention is shown by way of example in the accompanying drawings.

Fig. 3 is a plan view showing the device in weighing position.

Figure 1:
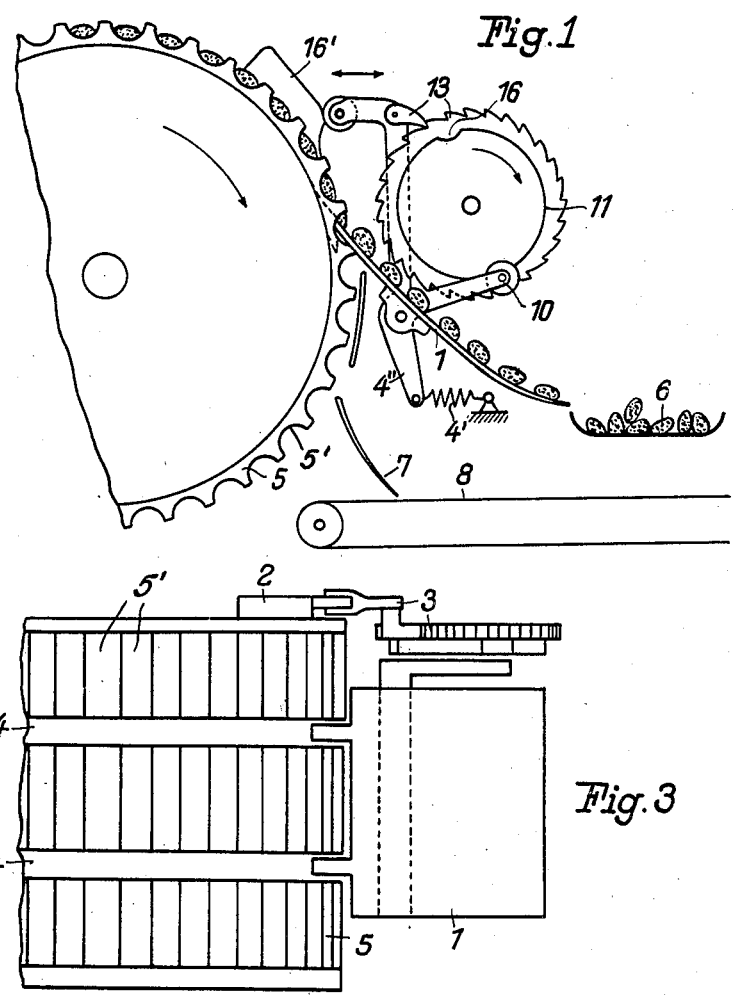
Fig. 1 is a side elevational view showing the device in weighing position.
Figure 2:
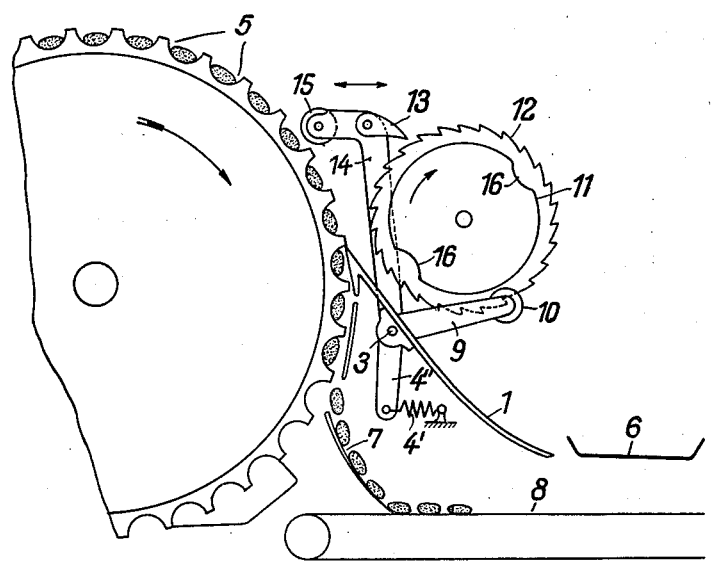
Fig. 2 is also a side elevational view showing the position of parts during an interval between two weighing operations.

1 denotes a delivery sheet which is adapted to be lifted and lowered periodically. In the position shown in Figs. 1 and 2 the upper end of the delivery sheet 1 engages the under circumferential grooves 4 in the delivery drum 5 in such a manner, that the cigarettes in the longitudinal receiving grooves 5' are forced to slide over the sheet 1 onto an automatic weighing device 6. The number of the cigarettes which at each weighing period are conveyed to the weighing device depends upon the length of the time during which the sheet 1 is kept in operative position, i. e. in contact with the bottom of the circumferential grooves 4 and beneath the longitudinal cigarette receiving grooves 5' in the drum 5. When the delivery sheet 1 is moved into the position shown in Fig. 2 the cigarettes will no more slide over this sheet but will drop onto the conveyor band 8 over the guide sheet 7. The rocking or deflecting movement of the member 1 is called forth by a special mechanism which will now be described:

The discharge sheet 1 is arranged on the pivot 3 of a bell crank lever one arm 4" of which is connected to a spring 4'. The other arm 9 of the bell crank lever is at its outer end equipped with a roller 10 or the like adapted to be intermittently pressed against the periphery of a rotatable cam disc 11. This cam disc is connected to a ratchet wheel 12, which is periodically moved by means of a pawl 13. The pawl 13 may for instance be connected to a bell crank lever 14 one arm of which is equipped with a roller 15 adapted to cooperate with cams 16' of the rotating delivery drum 5. The rocking movements imparted to the lever 14 by the cams 16' are imparted to the pawl 13, which thereby is brought into and out of engagement with the ratchet wheel 12.

As long as the roller 10 of the lever 4", 9 rests on the circular parts of the periphery of the disc 11 the upper end of the delivery sheet 1 will be held out of engagement with the drum 5 and no cigarettes will be delivered to the weighing apparatus 6. As soon as the roller 10 drops into one of the grooves 16 of the disc 11 however the upper end of the sheet 1 will be lowered into engagement with the grooves in the drum 5, whereby the cigarettes in the grooves will be discharged onto the weighing apparatus, until the sheet 1 again is swung into inoperative position.

It is obvious that various changes and modifications may be made in practicing the invention, in departure from the particular showing and description, without departing from the true spirit of the invention.

I claim:—

1. In a device for the automatic removal of cigarettes from a cigarette machine for conveying them in groups to a weighing apparatus, a discharge drum provided with grooves adapted to receive the cigarettes to be discharged from the machine, a delivery element, and operating means for periodically bringing one end of said delivery element into a position under the grooves in the discharge drum, thereby forcing the cigarettes in said grooves to roll over the said delivery element.

2. In a device for the automatic removal of cigarettes from a cigarette machine for conveying them in groups to a weighing apparatus, a discharge drum provided with circumferential grooves and with longitudinal grooves adapted to receive the cigarettes to be discharged from the machine, a deflectable delivery element having a tongue-shaped upper end of substantially the same curvature as the circumferential grooves in the said discharge drum, and operating means for periodically bringing said tongue-shaped upper end of the delivery element into engagement with the circumferential grooves in the discharge drum, thereby forcing the cigarettes in said longitudinal grooves to roll over the said delivery element.

In testimony whereof I affix my signature.

OTTO LIED.